United States Patent
Zhang et al.

(10) Patent No.: US 12,347,120 B2
(45) Date of Patent: Jul. 1, 2025

(54) VISION-BASED TARGET TRACKING METHOD, SYSTEM, EQUIPMENT, AND STORAGE MEDIUM

(71) Applicant: REMO TECH Co., Ltd., Guangdong (CN)

(72) Inventors: Ming Zhang, Guangdong (CN); Jian Dong, Guangdong (CN); Shuai Li, Guangdong (CN)

(73) Assignee: REMO TECH Co., Ltd., Shenzhen (CN)

( * ) Notice: Subject to any disclaimer, the term of this patent is extended or adjusted under 35 U.S.C. 154(b) by 420 days.

(21) Appl. No.: 17/886,515

(22) Filed: Aug. 12, 2022

(65) Prior Publication Data

US 2022/0383518 A1 Dec. 1, 2022

Related U.S. Application Data

(63) Continuation of application No. PCT/CN2020/076360, filed on Feb. 24, 2020.

(30) Foreign Application Priority Data

Feb. 14, 2020 (CN) .......................... 202010095228.9

(51) Int. Cl.
  *G06T 7/246* (2017.01)
  *G06T 7/73* (2017.01)
  (Continued)

(52) U.S. Cl.
  CPC ............... *G06T 7/248* (2017.01); *G06T 7/73* (2017.01); *G06V 10/761* (2022.01); *G06V 40/168* (2022.01); *G06T 2207/30201* (2013.01)

(58) Field of Classification Search
  CPC . G06T 7/248; G06T 7/73; G06T 2207/30201; G06T 2207/30196;
  (Continued)

(56) References Cited

U.S. PATENT DOCUMENTS

2008/0187175 A1 8/2008 Kim et al.
2019/0114501 A1* 4/2019 Kuo ........................ G06F 18/22
(Continued)

FOREIGN PATENT DOCUMENTS

CN   102057665 A   5/2011
CN   104346811 A   2/2015
(Continued)

OTHER PUBLICATIONS

International Search Report of PCT Patent Application No. PCT/CN2020/076360 issued on Nov. 18, 2020.

*Primary Examiner* — Tom Y Lu
*Assistant Examiner* — Pardis Sohraby

(57) ABSTRACT

A vision-based target tracking method, a system, an equipment, and a storage medium. The method includes: acquiring face positions and body positions in a current image frame; acquiring a current position of a time-series tracking target by a time-series tracking algorithm; determining, when a face matching the face of a to-be-tracked target does not exist outside a region corresponding to the current position of the time-series tracking target, whether the time-series tracking target is in an intersecting state; determining whether a body matching the body of the to-be-tracked target in other persons intersecting the times-series tracking target when in the intersecting state, or using the current position of the time-series tracking target as a current target position if not in the intersecting state; and taking the current target position as the position of the to-be-tracked target in the previous frame, and returning to the above steps.

13 Claims, 6 Drawing Sheets

(51) Int. Cl.
*G06V 10/74* (2022.01)
*G06V 40/16* (2022.01)

(58) Field of Classification Search
CPC ...... G06T 7/20; G06V 10/761; G06V 40/168; G06V 40/167; G06V 40/161; G06V 40/10; Y02D 10/00
USPC .......................................................... 382/103
See application file for complete search history.

(56) References Cited

U.S. PATENT DOCUMENTS

| | | | | |
|---|---|---|---|---|
| 2019/0362503 A1* | 11/2019 | Luo | .......................... | G06F 18/22 |
| 2020/0273179 A1* | 8/2020 | Zhang | .................. | G06V 40/173 |
| 2020/0342211 A1* | 10/2020 | Wang | ...................... | G06T 7/246 |
| 2021/0134009 A1* | 5/2021 | Zhang | .................. | G06V 40/166 |
| 2021/0312642 A1* | 10/2021 | Zhang | .................... | G06F 18/22 |

FOREIGN PATENT DOCUMENTS

| | | | |
|---|---|---|---|
| CN | 107316322 A | 11/2017 |
| CN | 110111358 A | 8/2019 |
| CN | 110414443 A | 11/2019 |

* cited by examiner

VISION-BASED TARGET TRACKING METHOD, SYSTEM, EQUIPMENT, AND STORAGE MEDIUM

CROSS REFERENCE TO RELATED APPLICATIONS

The present application is a Continuation Application of PCT Application No. PCT/CN2020/076360 filed on Feb. 24, 2020, which claims priority from Chinese patent application No. 202010095228.9 filed on Feb. 14, 2020, the entire content of which is incorporated herein by reference.

TECHNICAL FIELD

The present disclosure relates to the technical field of image processing, and in particular, to a vision-based target tracking method, a system, an equipment and a storage medium.

BACKGROUND TECHNOLOGY

Existing vision-based target tracking algorithms usually use a correlation filtering algorithm, that is, obtaining an image template of a to-be-tracked target according to a current image, calculating a position in the next image frame that matches the best with the target template by means of correlation filtering, and taking the position as the position of the target.

The correlation filter tracking algorithm usually uses real-time templates for target matching. Although a more robust template can be obtained by optimization using historical templates, however, this algorithm has poor effect in the case of an abruptly changing and fast-moving target. Hence the tracking effect is poor under circumstances of the irregular motion and the significant changes in posture of human bodies.

SUMMARY

An embodiment of the present application provides a vision-based target tracking method, system, apparatus and storage medium, aiming to reduce target tracking errors, improve the tracking effect, and ensure the tracking stability.

In a first aspect, an embodiment of the present application provides a vision-based target tracking method, including step A: reading a current image frame so as to acquire and save face positions and body positions of all persons in the current image frame; step B: acquiring a previous image frame and a position of a to-be-tracked target in the previous frame, and acquiring, according to the current image frame, the previous image frame, and the position of the target in the previous frame, a current position of a time-series tracking target by means of a time-series tracking algorithm; step C: determining whether a person matching a face of the to-be-tracked target exists outside of a region corresponding to the current position of the time-series tracking target, and if not, proceeding to step D; step D: determining, according to the current position of the time-series tracking target and body positions of other persons, whether the time-series tracking target is in an intersecting state, and if yes, proceeding to step E; step E: determining whether there is a person matching a body of the to-be-tracked target amongst other persons intersecting with the time-series tracking target, if not, taking the current position of the time-series tracking target as a current target position, and proceeding to step F; step F: maintain tracking, proceeding to step G; step G: taking the current target position as the position of the to-be-tracked target in the previous frame, taking the current image frame as the previous image frame, and returning to step A.

In a second aspect, the embodiment of the present application provides a vision-based target tracking system, which includes a face and body detection module, a time-series tracking module, a face matching module, a body intersection determination module, a body matching module, and an update module. The face and body detection module is used for reading a current image frame so as to acquire and save face positions and body positions of all persons in the current image frame. The time-series tracking module is used for acquiring a previous image frame and a position of a to-be-tracked target in the previous frame, and acquiring, according to the current image frame, the previous image frame, and the position of the target in the previous frame, a current position of a time-series tracking target by means of a time-series tracking algorithm. The face matching module is used for determining whether a person matching a face of the to-be-tracked target exists outside of a region corresponding to the current position of the time-series tracking target and obtaining the current target position according to the determining result. The body intersection determination module is used for determining, according to the current position of the time-series tracking target and body positions of other persons, whether the time-series tracking target is in an intersecting state. The body matching module is used for determining whether there is a person matching a body of the to-be-tracked target amongst other persons intersecting with the time-series tracking target, and obtaining the current target position according to the determining result. The update module is used for taking the current target position as the position of the to-be-tracked target in the previous frame, using the current image frame as the previous image frame.

In a third aspect, an embodiment of the present application provides a computer equipment, which includes a memory and a processor, the memory stores a computer program that can be executed by the processor, and the processor implements the above vision-based target tracking method when executing the computer program.

In a fourth aspect, an embodiment of the present application further provides a computer-readable storage medium storing a computer program, the computer program includes program instructions, and the program instructions, when executed, implement the above-mentioned vision-based target tracking method.

The vision-based target tracking method provided by the present application combines time-series tracking algorithm, face recognition and body recognition for target tracking. By combining the time-series tracking algorithm, a more reliable target position may be obtained, and the possibility of a sudden change in the posture of the target person is reduced; the face recognition is set as the first priority of target switching, and tracking of a wrong person in the intersecting state is effectively avoided by employing the body recognition, thereby reducing the tracking error during irregular intersection of the target person and other persons, and improving the accuracy of target tracking with high robustness.

BRIEF DESCRIPTION OF THE DRAWINGS

In order to explain the technical proposals of the embodiments of the present application more clearly, the drawings mentioned in the description of the embodiments will be briefly described.

DETAILED DESCRIPTION OF THE EMBODIMENTS

The technical proposals in the embodiments of the present application will be clearly and completely described in conjunction with the accompanying drawings in the embodiments of the present application. Apparently, the described embodiments are some of the embodiments of the present application, rather than all of them.

It should be understood that when used in the specification and the appended claims, the terms "including" and "comprising" indicate the existence of the described features, integers, steps, operations, elements and/or components, but do not exclude the existence or addition of one or more other features, integers, steps, operations, elements, components, and/or collections thereof. The terms used in the specification of the present application are only for describing the specific embodiments and are not intended to limit the application. As used in the specification and the appended claims of the present application, unless indicated otherwise in the context, the singular forms "a", "an" and "the" are intended to include plural forms. The term "and/or" used in the specification and appended claims of the present application refers to any and all possible combinations of one or more of the associated listed items, and includes these combinations.

Figure 1:
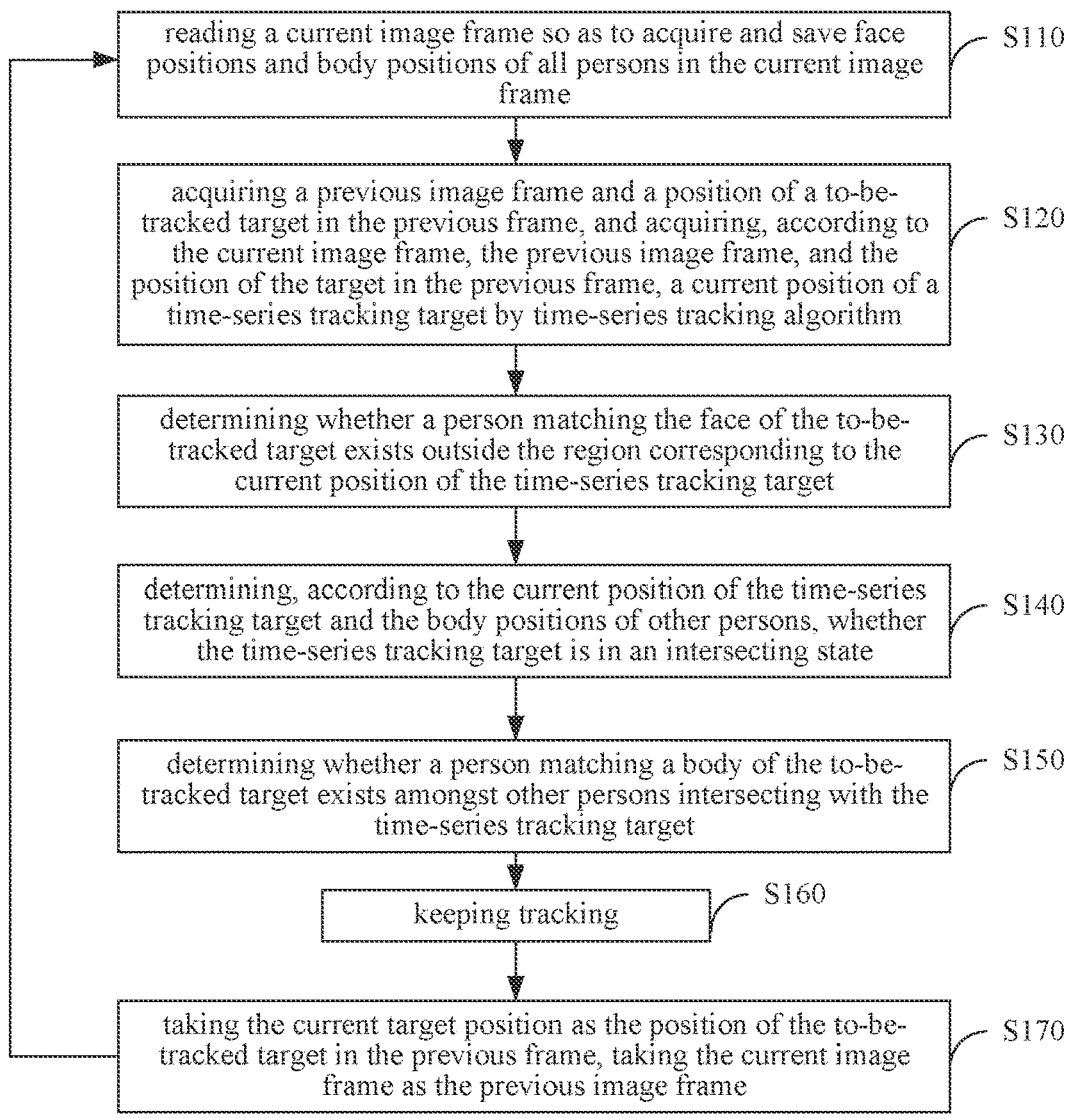
FIG. 1 is a flowchart of a vision-based target tracking method provided by a first embodiment of the present application.

Referring to FIG. 1, showing a flowchart of a vision-based target tracking method provided by a first embodiment of the present application, the method includes:

Step S110: reading a current image frame so as to acquire and save face positions and body positions of all persons in the current image frame. The positions represent the coordinates of each end point of the corresponding region in the image, and the corresponding region is rectangular; the corresponding region is obtained by combining the coordinates of each end point, and then the corresponding region in the image is obtained through the positions. Specifically, the face position is represented by the endpoint coordinates at the upper left corner and the lower right corner of the corresponding region of a human face in the current image frame, and the body position is represented by the endpoint coordinates at the upper left corner and the lower right corner of the corresponding region of a body in the current image frame.

Step S120: acquiring a previous image frame and a position of a to-be-tracked target in the previous frame, and acquiring, according to the current image frame, the previous image frame, and the position of the target in the previous frame, a current position of a time-series tracking target by means of a time-series tracking algorithm. The to-be-tracked target refers to the person to be tracked, the time-series tracking target refers to the tracking target obtained based on the time-series tracking algorithm, and the current position of the time-series tracking target refers to the body position of the tracking target obtained based on the time-series tracking algorithm. By using a time-series tracking algorithm to track the time-series information of the to-be-tracked target, more reliable position information may be predicted and obtained. The existing time-series filtering target tracking method, such as "Target tracking method based on multilayer time sequence filtering" of the Chinese patent application CN110111358A, may be employed, hence will not be repeated herein.

Figure 2:
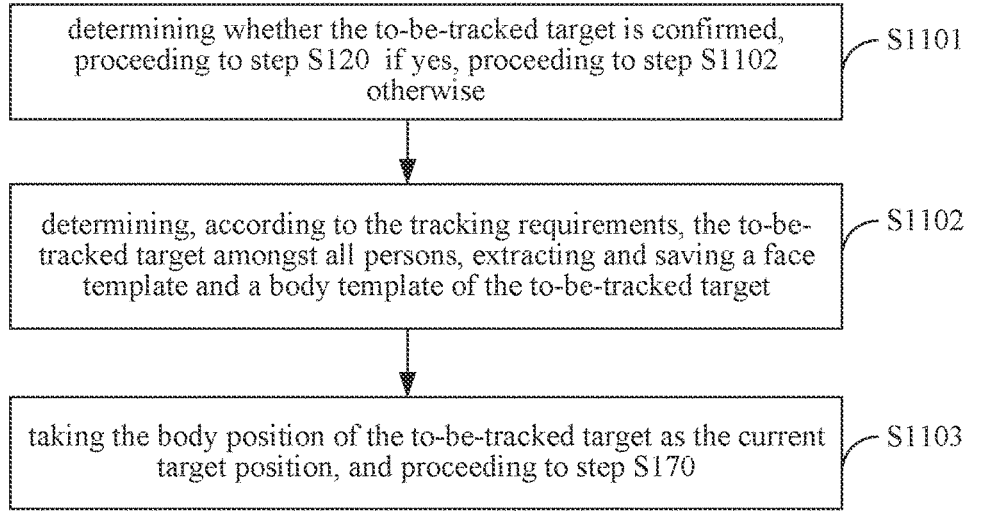
FIG. 2 is a flowchart of a sub-process of the vision-based target tracking method provided by the first embodiment of the present application.

In some embodiments, specifically, as shown in FIG. 2, the step S120 is proceeded by:

Step S1101: determining whether the to-be-tracked target is confirmed, if yes, proceeding to step S120; otherwise, proceeding to step S1102.

Step S1102: determining, according to the requirements of tracking, the to-be-tracked target amongst all persons, extracting and saving a face template and a body template of the to-be-tracked target.

Preferably, step S1102 specifically includes: determining, according to the requirements of tracking, the to-be-tracked target amongst all persons, obtaining a face image and a body image of the to-be-tracked target, extracting the face template of the to-be-tracked target by combining the face recognition model based on the deep neural network with the obtained face image, and extracting the body template of the to-be-tracked target by combining the body recognition model based on the deep neural network with the obtained body image.

Step S1103: taking the body position of the to-be-tracked target as the current target position, and proceeding to step S170.

In this embodiment, if the to-be-tracked target has been determined, then proceed to step S120 to obtain the current position of the time-series tracking target; if the to-be-tracked target has not been determined, then the to-be-tracked target is obtained according to the tracking requirement, and the body position of the to-be-tracked target is used as the current target position, and then proceed to step S170 to track the to-be-tracked target.

Step S130: determining whether a person matching the face of the to-be-tracked target exists outside the region corresponding to the current position of the time-series tracking target, and if not, proceed to step S140. By determining whether there is a person matching the face of the to-be-tracked target outside the region corresponding to the current position of the time-series tracking target to confirm if the tracking is wrong, so that the location information obtained by the time-series tracking is verified to ensure the tracking accuracy, and at the same time, face recognition is taken as the first priority for switching a target. Matching with the face of the to-be-tracked target refers to matching with the face template of the to-be-tracked target, and the face template represents a facial feature template, which is extracted from the face image of the to-be-tracked target using a face recognition model based on the deep neural network.

Step S140: determining, according to the current position of the time-series tracking target and the body positions of other persons, whether the time-series tracking target is in an intersecting state, and if yes, proceed to step S150. The intersecting state refers to an overlap of regions corresponding to the body positions of the persons.

If a person matching the face of the to-be-tracked target does not exist outside the region corresponding to the current position of the time-series tracking target, then the to-be-tracked target is not in the region outside the current position of the time-series tracking target. It is then determined whether the time-series tracking target is in an intersecting state, according to the current position of the time-series tracking target and the body positions of other persons, so as to determine whether the to-be-tracked target is at the current position of the time-series tracking target. In this way, the accuracy of the time-series tracking target is determined by both the face matching of the persons outside the region corresponding to the current position of the time-series tracking target and the intersecting state of the time-series tracking target within the current position of the time-series tracking target, which provides more assurance. Other persons refer to all non-tracking-target persons, in the current image frame, whose intersection/union ratio of the region corresponding to the body position and the region corresponding to the current position of the time-series tracking target is greater than a predetermined intersection/union ratio threshold, where the intersection/union ratio represents the ratio between the intersection and the union.

Step S150: determining whether a person matching a body of the to-be-tracked target exists amongst other persons intersecting with the time-series tracking target, if not, taking the current position of the time-series tracking target as a current target position, and proceeding to step S160.

The current target position represents an accurate body position of the to-be-tracked target, and matching with the body of the to-be-tracked target refers to matching with the body template of the to-be-tracked target, where the body template is a body feature template, which is extracted from the body image of the to-be-tracked target by means of the body recognition model based on the deep neural network. By determining whether there is a person matching the body of the to-be-tracked target amongst other persons intersecting with the time-series tracking target, it is then determined whether other persons are the to-be-tracked target, and the tracking accuracy is improved. When a person matching the body of the to-be-tracked target does not exist amongst the other persons intersecting with the time-series tracking target, then the other persons intersecting with the time-series tracking target are not the person that need to be tracked, and the time-series tracking target is the person that needs to be tracked, and the tracking is correct. At this time, the current position of the time-series tracking target is the current target position, which improves the reliability of tracking.

Step S160: keeping tracking, and proceeding to step S170. After the time-series tracking is determined to be correct, the to-be-tracked target is tracked and recorded according to the obtained current target position.

Step S170: taking the current target position as the position of the to-be-tracked target in the previous frame, taking the current image frame as the previous image frame, and returning to step S110.

The vision-based target tracking method provided by the present application combines time-series tracking algorithm, face recognition and body recognition for target tracking. By combining the time-series tracking algorithm, a more reliable target position may be obtained according to the time-series information of the to-be-tracked target. Moreover, the possibility of a sudden change in the posture of the target person is reduced, such that a more reliable target position may be obtained when the to-be-tracked target is not in an intersecting state. The face recognition is set as the first priority of target switching to correct the time-series tracking target, and the body recognition is employed to effectively reduce tracking of a wrong person in the intersecting state, thereby reducing the tracking error during irregular intersection of the target person and other persons, and improving the accuracy of target tracking with high robustness.

Figure 3:
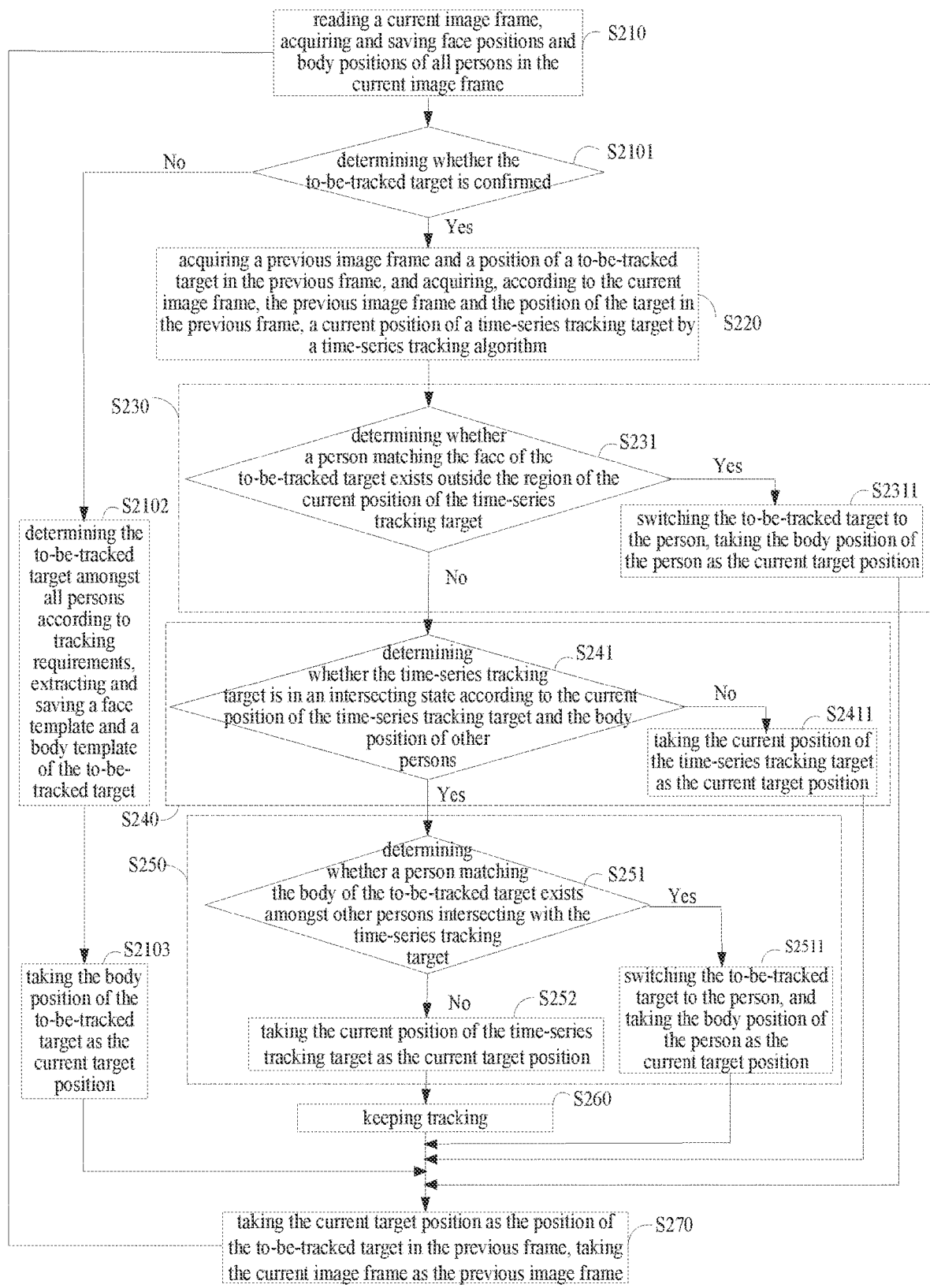
FIG. 3 is a flowchart of a vision-based target tracking method provided by a second embodiment of the present application.

FIG. 3 is a flowchart of a vision-based target tracking method provided by a second embodiment of the present application. As shown in FIG. 3, the vision-based target tracking method of this embodiment includes steps S210-S270, step S210 is similar to step S110 in the above embodiment, steps S2101-S2103 are similar to steps S1101-S1103 in the above embodiment, step S220 is similar to step S120 in the above embodiment, and steps S260-S270 are similar to steps S160-S170 in the above embodiment, which are not repeated herein. The different steps S230-S250 in the present embodiment will be described in detail below.

In this embodiment, the step S230 is specifically: step S231, determining whether a person matching the face of the to-be-tracked target exists outside the region corresponding to the current position of the time-series tracking target, and if not, proceeding to step S240.

Specifically, the step S230 further includes step S2311: if there is a person matching the face of the to-be-tracked target outside the region corresponding to the current position of the time-series tracking target, switching the to-be-tracked target to the person, taking the body position of the person as the current target position, and proceeding to step S270.

The time-series tracking target refers to the tracking target obtained based on the time-series tracking algorithm, and the current position of the time-series tracking target refers to the body position of the tracking target obtained based on the time-series tracking algorithm. The existing time-series filtering target tracking method, such as "Target tracking method based on multilayer time sequence filtering" of the Chinese patent application CN110111358A, may be employed as the time-series tracking algorithm, which will not be repeated herein. The current target position represents the accurate body position of the to-be-tracked target. Matching with the face of the to-be-tracked target refers to matching with the face template of the to-be-tracked target, and the face template is the facial feature template, which is extracted from the face image of the to-be-tracked target using a face recognition model based on the deep neural network. When there is a person matching the face of the to-be-tracked target outside the region corresponding to the current position of the time-series tracking target, the time-series tracking target is not the person to be tracked, and the person that matches the face template of the to-be-tracked target should be taken as the to-be-tracked target, the body position of the person is then taken as the current target position to correct the tracking process.

In this embodiment, step S240 is specifically: step S241, determining, according to the current position of the time-series tracking target and the body position of other persons, whether the time-series tracking target is in an intersecting state, if the time-series tracking target is in an intersecting state, proceeding to step S250, where the intersecting state refers to a state in which regions corresponding to the body positions of the persons overlap.

Specifically, the step S240 further includes step S2411: if the time-series tracking target is not in the intersecting state, taking the current position of the time-series tracking target as the current target position, and proceeding to step S270.

If a person matching the face of the to-be-tracked target does not exist outside the region corresponding to the current position of the time-series tracking target, then the to-be-tracked target is not in the region outside the current position of the time-series tracking target. It is then determined whether the time-series tracking target is in the intersecting state, according to the current position of the time-series tracking target and the body positions of other persons, so as to determine whether the to-be-tracked target is at the current position of the time-series tracking target. In this way, the accuracy of the time-series tracking target is determined by both the face matching of the persons outside the region corresponding to the current position of the time-series tracking target and the intersecting state of the time-series tracking target within the current position of the time-series tracking target, which provides more assurance. If a person matching the face of the to-be-tracked target does not exist outside the region corresponding to the current position of the time-series tracking target, and the time-series tracking target is not in the intersecting state, then the time-series tracking target is the correct person to be tracked, and the tracking process is correct. At this time, the current position of the time-series tracking target is the current target position. Other persons refer to all non-tracking-target persons, in the current image frame, whose intersection/union ratio of the region corresponding to their body positions and the region corresponding to the current position of the time-series tracking target is greater than a predetermined intersection/union ratio threshold, where the intersection/union ratio represents the ratio between the intersection and the union.

In this embodiment, step S250 specifically includes:

Step S251: determining whether there is a person matching the body of the to-be-tracked target amongst other persons intersecting with the time-series tracking target.

Step S252: if a person matching the body of the to-be-tracked target does not exist amongst other persons intersecting with the time-series tracking target, taking the current position of the time-series tracking target as the current target position, and proceeding to step S260.

Specifically, the step S250 further includes step S2511: if there is a person matching the body of the to-be-tracked target amongst other persons intersecting with the time-series tracking target, switching the to-be-tracked target to this person, and taking the body position of the person as the current target position, and proceeding to step S270.

The current target position represents an accurate body position of the to-be-tracked target, and matching with the body of the to-be-tracked target refers to matching with the body template of the to-be-tracked target, where the body template is a body feature template, which is extracted from the body image of the to-be-tracked target by means of the body recognition model based on the deep neural network. By determining whether there is a person matching the body of the to-be-tracked target amongst other persons intersecting with the time-series tracking target, the tracking accuracy is improved. When a person matching the body of the to-be-tracked target does not exist amongst other persons that intersect with the time-series tracking target, the time-series tracking target is the person to be tracked, and the tracking is correct. At this time, the current position of the time-series tracking target is the current target position, the tracking reliability is increased. When there is a person matching the body of the to-be-tracked target amongst other persons intersecting with the time-series tracking target, the time-series tracking target is not the person to be tracked, and the person matching the body of the to-be-tracked target amongst other persons is taken as the to-be-tracked target, and the position of the body corresponding to the person is taken as the current target position.

The vision-based target tracking method provided by the present application combines time-series tracking algorithm, face recognition and body recognition for target tracking. By combining the time-series tracking algorithm, a more reliable target position may be obtained according to the time-series information of the to-be-tracked target. Moreover, the possibility of a sudden change in the posture of the target person is reduced, such that a more reliable target position may be obtained when the to-be-tracked target is not in an intersecting state. The face recognition is set as the first priority of target switching to correct the time-series tracking target, and the body recognition is employed to effectively reduce tracking of a wrong person in the intersecting state, thereby reducing the tracking error during irregular intersection of the target person and other persons, and improving the accuracy of target tracking with high robustness.

Figure 4:
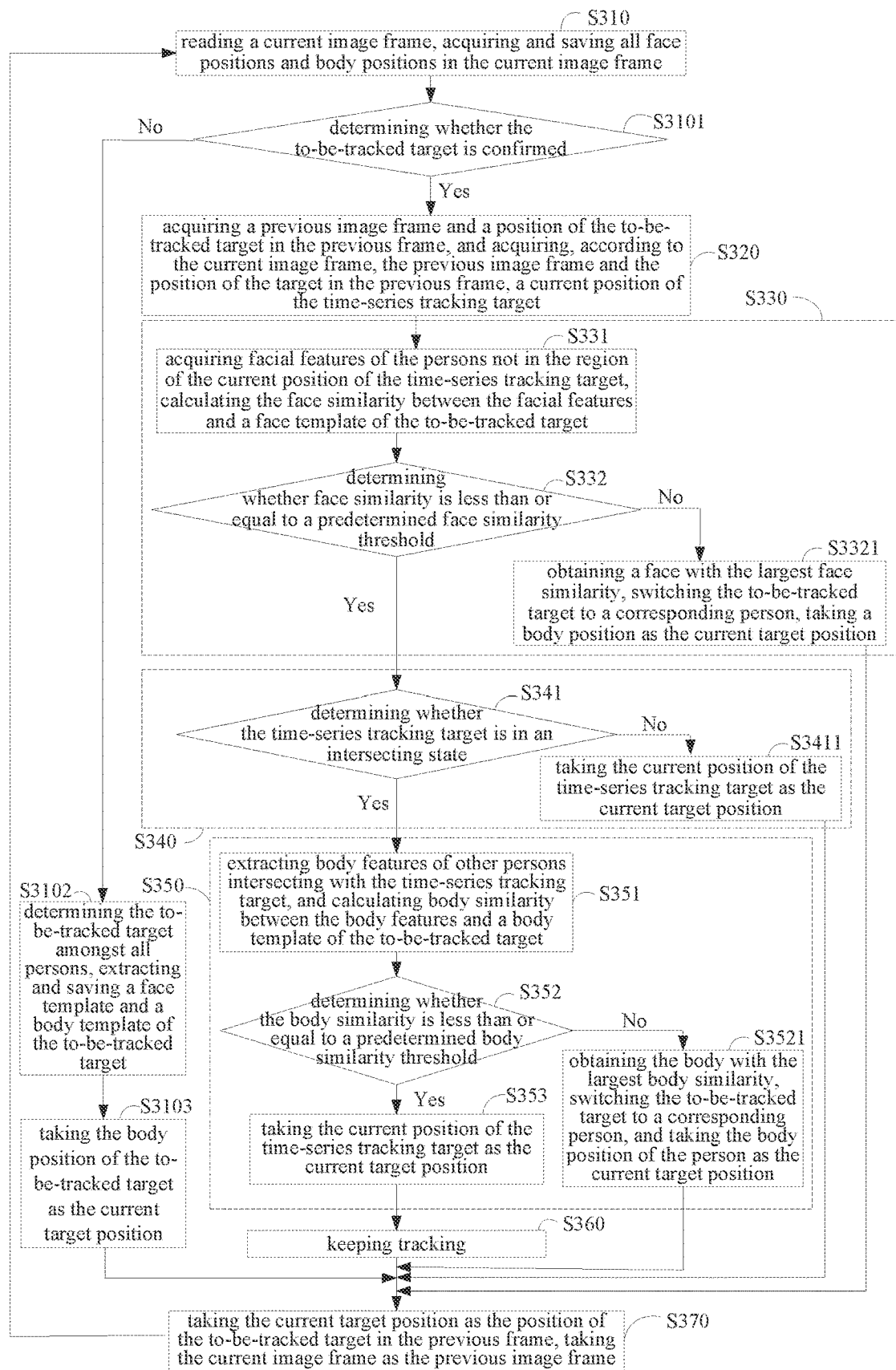
FIG. 4 is a flowchart of a vision-based target tracking method provided by a third embodiment of the present application.

FIG. 4 is a flowchart of a vision-based target tracking method provided by a third embodiment of the present application. As shown in FIG. 4, the vision-based target tracking method of this embodiment includes steps S310-S370. Step S310 is similar to step S210 in the second embodiment, steps S3101-S3103 are similar to steps S2101-S2103 in the second embodiment, step S320 is similar to step S220 in the second embodiment, step S340 is similar to step S240 in the second embodiment, and steps S360-S370 are similar to steps S260-S270 in the second embodiment, and these steps will not be repeated herein. The different steps S330 and S350 in this embodiment will be described in detail below.

In this embodiment, the step S330 specifically includes:

Step S331: acquiring all facial features corresponding to the persons outside the region corresponding to the current position of the time-series tracking target, and calculating the face similarity between the facial features corresponding to the persons not in the region corresponding to the current position of the time-series tracking target and the face template of the to-be-tracked target. The time-series tracking target refers to the tracking target obtained based on the time-series tracking algorithm, and the current position of the time-series tracking target refers to the body position of the tracking target obtained based on the time-series tracking algorithm. The face template is the facial feature template, which is extracted from the face image of the to-be-tracked target using a face recognition model based on the deep neural network. By obtaining persons outside the region corresponding to the current position of the time-series tracking target, it can be determined more quickly and conveniently whether the to-be-tracked target is in the region corresponding to the current position of the time-series tracking target, so that location information obtained by the time-series tracking can be verified to ensure tracking accuracy.

Step S332: determining whether the face similarity is less than or equal to a predetermined face similarity threshold, if the face similarity is less than or equal to the predetermined face similarity threshold, proceeding to step S340.

By acquiring the facial features corresponding to the persons outside the region corresponding to the current position of the time-series tracking target, and determining whether the face similarity with respect to the face template of the to-be-tracked target is less than or equal to the predetermined face similarity threshold, it is determined quickly whether the to-be-tracked target is not in the region corresponding to the current position of the time-series tracking target, so that it is determined whether there is a person matching the face of the to-be-tracked target outside the region corresponding to the current position of the time-series tracking target. If the face similarities between the facial features corresponding to all the persons outside the region corresponding to the current position of the time-series tracking target and the face template of the to-be-tracked target are less than or equal to the predetermined face similarity threshold, then a person matching the face of the to-be-tracked target does not exist outside the region corresponding to the current position of the time-series tracking target, the to-be-tracked target is in the region corresponding to the current position of the time-series tracking target, and the accuracy of the tracking region is assured.

Figure 5:
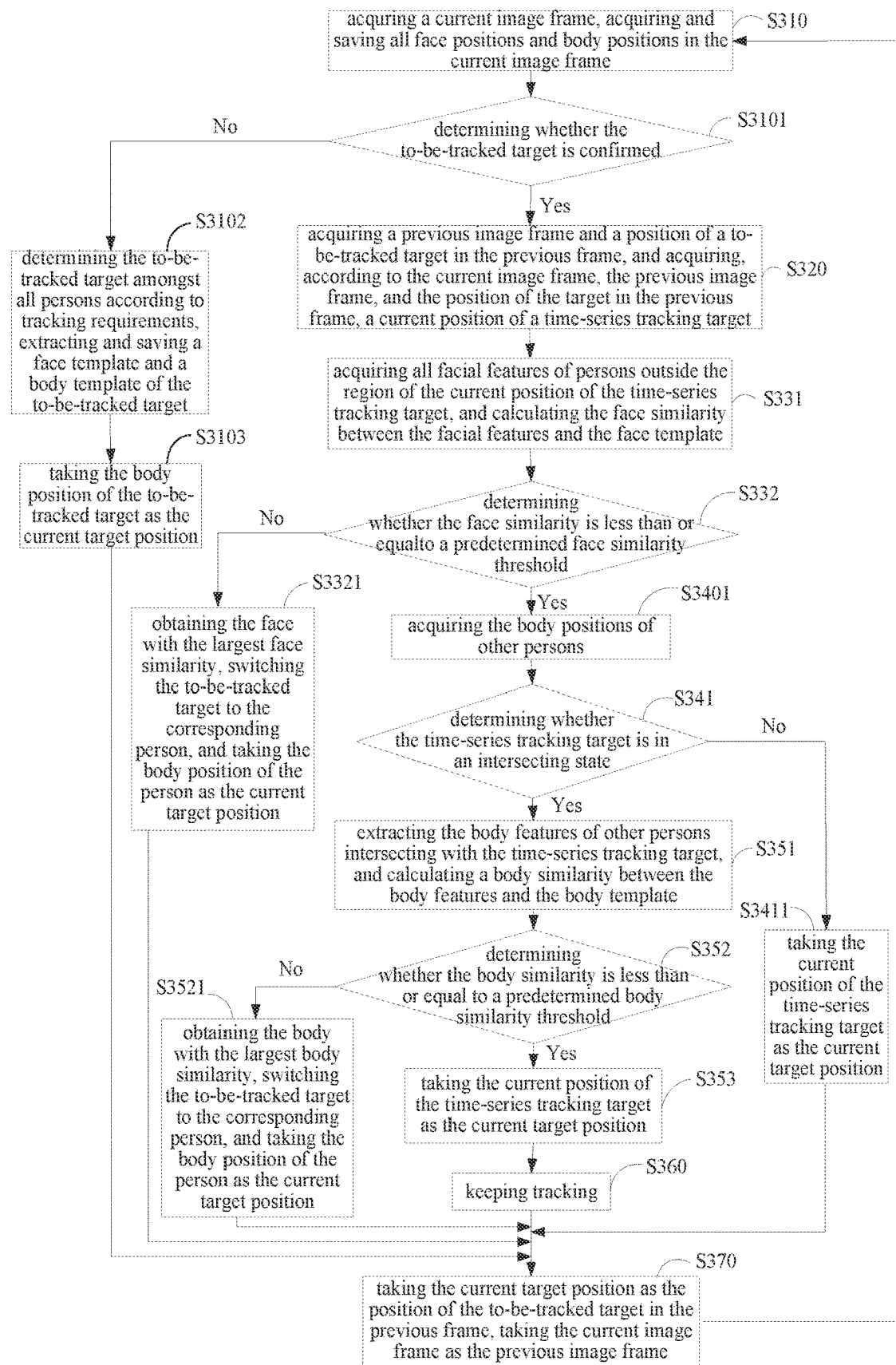
FIG. 5 is a flowchart of a specific process of the vision-based target tracking method provided by the third embodiment of the present application.

In some embodiments, as shown in FIGS. 4 and 5, the step S330 further includes step S3321: if the face similarity is greater than the predetermined face similarity threshold, obtaining the face with the facial feature having the largest face similarity, switching the to-be-tracked target to the person corresponding to the face, and taking the body position of the person as the current target position, and proceeding to step S370. The current target position represents the exact body position of the to-be-tracked target. When the face similarity between the facial feature of the person outside the region corresponding to the current position of the time-series tracking target and the face template of the to-be-tracked target is greater than the predetermined face similarity threshold, then there is a person matching the face of the to-be-tracked target outside the region corresponding to the current target position, and the person corresponding to the current position of the time-series tracking target is not the person that should be tracked. Therefore, the person corresponding to the face that has the facial feature of the largest face similarity amongst those faces whose face similarities are greater than the threshold is taken as the to-be-tracked target, so as to update a correct to-be-tracked target, and the corresponding body position is taken as the current target position.

Specifically, in some embodiments, as shown in FIG. 5, the step S340 includes step S3401, step S341 and step S3411. The step S341 is similar to the step S241 in the second embodiment, and the step S3411 is similar to the step S2411 in the second embodiment, which will not be repeated herein. The step S3401 is executed before the step S341, which is specifically:

Step S3401, acquiring the body positions of other persons.

In some embodiments, the step S3401 is specifically: acquiring the regions corresponding to the body positions of all the non-tracking targets in the current image frame, and calculating their intersection/union ratios with respect to the region corresponding to the current position of the time-series tracking target, and obtaining the body positions of the persons corresponding to the regions having the intersection/union ratios greater than a predetermined intersection/union threshold, and taking the persons as the body positions of other persons.

The intersection/union ratio represents the ratio between the intersection and the union. The non-tracking target refers to all persons except the time-series tracking target. Calculating the intersection/union ratio between regions corresponding to the body positions of the non-tracking target and the region corresponding to the current position of the time-series tracking target may preliminarily exclude the region corresponding to the body position of the person who does not intersect with the region corresponding to the current position of the time-series tracking target, in order to determine the intersecting state. A larger intersection/union ratio represents a larger intersection area. Other persons refer to all persons who correspond to the regions of non-tracking targets that have intersection/union ratios with respect to the region corresponding to the current position of the time-series tracking target greater than the predetermined intersection/union threshold.

In this embodiment, step S350 specifically includes:

Step S351: extracting the body features of other persons intersecting with the time-series tracking target, and calculating body similarities between the body features of other persons and the body template of the to-be-tracked target.

Step S352: determining whether the body similarity is less than or equal to a predetermined body similarity threshold.

Step S353: if the body similarity is less than or equal to the predetermined body similarity threshold, taking the body position of the time-series tracking target as the current target position, and proceeding to step S360. The body template refers to a body feature template, which is extracted from the body image of the to-be-tracked target by using a body recognition model based on a deep neural network. The current target position represents the accurate body position of the to-be-tracked target. By determining the body similarity between the body features of other persons and the body template of the to-be-tracked target, it is determined whether other persons are the to-be-tracked target, thereby improving the tacking accuracy. If the body similarity is less than or equal to the predetermined body similarity threshold, then other persons that intersect with the time-series tracking target are not the person that should be tracked, and the time-series tracking target is the person to be tracked, and the tracking is correct. At this time, the current position of the time-series tracking target is the current target position, which improves the reliability of tracking.

In some embodiments, as shown in FIGS. 4 and 5, step S352 further includes: if the body similarity is greater than the predetermined body similarity threshold, proceeding to step S3521.

Step S3521: if the body similarity is greater than the predetermined body similarity threshold, obtaining the body corresponding to the body feature with the largest body similarity, and switching the to-be-tracked target to the person corresponding to the body, and taking the body position of the person as the current target position, and proceeding to step S370.

When the body similarity of other persons intersecting with the time-series tracking target is greater than the predetermined body similarity threshold, then the person corresponding to the current position of the time-series tracking target is not the person that should be tracked, and another person, amongst other persons, corresponding to the body of the body feature with the largest body similarity should be taken as the to-be-tracked target, and the corresponding body position is the current target position.

In the vision-based target tracking method provided by the present application, a more reliable target position may be obtained according to the time-series information of the to-be-tracked target by combining the time-series tracking algorithm. Moreover, the possibility of a sudden change in the posture of the target person is reduced, such that a more reliable target position may be obtained when the to-be-tracked target is not in an intersecting state. The body recognition is employed to effectively reduce tracking of a wrong person in the intersecting state, thereby reducing the tracking error during irregular intersection of the target person and other persons, and improving the accuracy of target tracking with high robustness.

Figure 6:
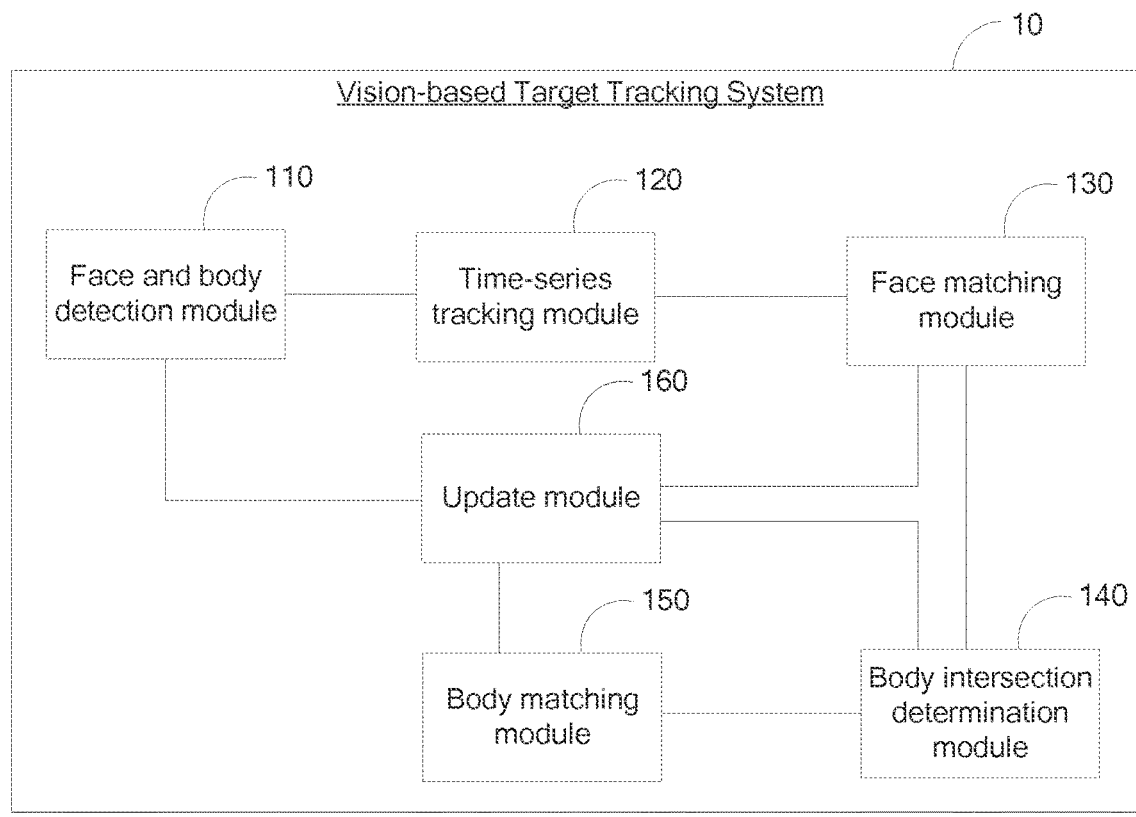
FIG. 6 is a block diagram of the vision-based target tracking system provided by an embodiment of the present application.

FIG. 6 is a block diagram of the vision-based target tracking system provided by an embodiment of the present application. Corresponding to the above vision-based target tracking method, as shown in FIG. 6, the present application provides a vision-based target tracking system 10, which includes a face and body detection module 110, a time-series tracking module 120, a face matching module 130, a body intersection determination module 140, a body matching module 150, and an update module 160. The face and body detection module 110 is used for reading a current image frame so as to acquire and save face positions and body positions of all persons in the current image frame. The positions represent the coordinates of each end point of the corresponding region in the image, and the corresponding region is rectangular; the corresponding region is obtained by combining the coordinates of each end point, and then the corresponding region in the image is obtained through the positions. Specifically, the face position is represented by the endpoint coordinates at the upper left corner and the lower right corner of the corresponding region of a human face in the current image frame, and the body position is represented by the endpoint coordinates at the upper left corner and the lower right corner of the corresponding region of a body in the current image frame.

The time-series tracking module 120 is used for acquiring a previous image frame and a position of a to-be-tracked target in the previous frame, and acquiring, according to the current image frame, the previous image frame, and the position of the target in the previous frame, a current position of a time-series tracking target by means of a time-series tracking algorithm. The to-be-tracked target refers to the person to be tracked, the time-series tracking target refers to the tracking target obtained based on the time-series tracking algorithm, and the current position of the time-series tracking target refers to the body position of the tracking target obtained based on the time-series tracking algorithm. By using a time-series tracking algorithm to track the time-series information of the to-be-tracked target, more reliable position information may be predicted and obtained. The existing time-series filtering target tracking method, such as "Target tracking method based on multilayer time sequence filtering" of the Chinese patent application CN110111358A, may be employed, hence will not be repeated herein.

The face matching module 130 is used for determining whether a person matching a face of the to-be-tracked target exists outside of a region corresponding to the current position of the time-series tracking target and obtaining the current target position according to the determining result. Specifically, the determination of whether there is a person matching the face of the to-be-tracked target outside the region corresponding to the current position of the time-series tracking target is conducted by calculating face similarities between facial features of all the persons outside the region corresponding to the current position of the time-series tracking target and the face template of the to-be-tracked target, and combining with a predetermined face similarity threshold. The current target position is obtained according to the determining result. The face matching module 130 obtains all the facial features corresponding to the persons outside the region corresponding to the current position of the time-series tracking target, and calculates face similarities between facial features of all the persons outside the region corresponding to the current position of the time-series tracking target and the face template of the to-be-tracked target, in order to determine whether the face similarities are less than or equal to the predetermined face similarity threshold. If the face similarity is greater than the predetermined face similarity threshold, then the time-series tracking target is not the correct to-be-tracked target, the face corresponding to the facial feature with the largest face similarity is obtained, the to-be-tracked target is switched to the person corresponding to that face, and the body position of the person is taken as the current target position. The face template refers to a facial feature template, which is extracted from the face image of the to-be-tracked target by using a face recognition model based on a deep neural network. If the face similarity is less than or equal to the predetermined face similarity threshold, the body intersection determination module 140 operates.

By using the face matching module 130 to obtain a person outside the region of the current position of the time-series tracking target, it is more quickly and easily determined whether the to-be-tracked target is no longer in the region corresponding to the current position of the time-series tracking target, so as to verify the location information obtained by time-series tracking to ensure tracking accuracy.

The body intersection determination module 140 is used for determining, according to the current position of the time-series tracking target and body positions of other persons, whether the time-series tracking target is in an intersecting state. Specifically, the body intersection determination module 140 obtains the regions corresponding to the body positions of all the non-tracking targets in the current image frame, and calculates their intersection/union ratio with respect to the regions corresponding to the current position of the time-series tracking target, in order to obtain the body positions corresponding to the regions of body positions whose intersection/union ratio are greater than the predetermined intersection/union ratio threshold. These body positions are taken as the body positions of other persons, and it is determined, according to the current position of the time-series tracking target and the body positions of other persons, whether the time-series tracking target is in an intersecting state. The intersection/union ratio represents the ratio between the intersection and the union. The non-tracking target refers to all persons except the time-series tracking target. Calculating the intersection/union ratio between regions corresponding to the body positions of the non-tracking target and the region corresponding to the current position of the time-series tracking target may preliminarily exclude the body position of the person who does not intersect with the current position of the time-series tracking target, in order to determine the intersecting state. A larger intersection/union ratio represents a larger intersection area. Other persons refer to all persons who correspond to the regions of non-tracking targets that have intersection/union ratios with respect to the region corresponding to the current position of the time-series tracking target greater than the predetermined intersection/union threshold. If the time-series tracking target is not in the intersecting state, the current position of the time-series tracking target is taken as the current target position.

When the to-be-tracked target is in the region corresponding to the current position of the time-series tracking target, the body intersection module 140 determines the intersecting state of the time-series tracking target within the current position of the time-series tracking target, thereby providing more assurance to improve the tracking accuracy.

The body matching module 150 is used for determining whether there is a person matching a body of the to-be-tracked target amongst other persons intersecting with the time-series tracking target, and obtaining the current target position according to the determining result. Specifically, whether there is a person matching the body of the to-be-tracked target in the other persons intersecting with the time-series tracking target is determined by extracting the body features of other persons intersecting with the time-series tracking target, and calculating the body similarity between the body features of other persons and the body template of the to-be-tracked target, in combination with a predetermined body similarity threshold. The current target position can be obtained according to the determining result, that is, if the body similarity is less than or equal to the predetermined body similarity threshold, then the time-series tracking target is the person to be tracked, and the current position of the time-series tracking target is taken as the current target position. The body template refers to a body feature template, which is extracted from the body image of the to-be-tracked target by using a body recognition model based on a deep neural network. If the body similarity is greater than the predetermined body similarity threshold, then the body corresponding to the body feature with the largest body similarity is obtained, and the to-be-tracked target is switched to the person corresponding to the body, and the body position of the person is taken as the current target position. When the body similarity of other persons intersecting with the time-series tracking target is greater than the predetermined body similarity threshold, then the person corresponding to the current position of the time-series tracking target is not the target that needs to be tracked, and the person corresponding to the body having the body feature with the largest body similarity amongst other persons should be taken as the to-be-tracked target, and the corresponding body position is the current target position. The body matching module 150 may have a better tracking effect on the time-series tracking target in the intersecting state, which may improve the tracking accuracy.

The update module 160 is used for taking the current target position as the position of the to-be-tracked target in the previous frame, using the current image frame as the previous image frame.

Based on the above design, the face and body detection module 110 is used for reading a current image frame so as to acquire and save face positions and body positions of all persons in the current image frame. The time-series tracking module 120 is used for acquiring a previous image frame and a position of a to-be-tracked target in the previous frame, and acquiring, according to the current image frame, the previous image frame, and the position of the target in the previous frame, a current position of a time-series tracking target by means of a time-series tracking algorithm. The face matching module 130 is used for acquiring all facial features corresponding to persons that are not in the region corresponding to the current position of the time-series tracking target, and calculating face similarities of all facial features corresponding to the persons that are not in the region corresponding to the current position of the time-series tracking target with respect to the face template of the to-be-tracked target. It is determined whether the face similarity is less than or equal to the determined face similarity threshold, so as to determine whether there is a person matching the face of the to-be-tracked target outside the region corresponding to the current position of the time-series tracking target. If the face similarity is greater than the predetermined face similarity threshold, then there is a person matching the face of the to-be-tracked target outside the region corresponding to the current position of the time-series tracking target, and the time-series tracking target is not the correct to-be-tracked target; the face corresponding to the facial feature with the largest face similarity is obtained, and the to-be-tracked target is switched to the person corresponding to the face, and the body position of the person is taken as the current target position, and the update module 160 is operated. The update module 160 is used for taking the current target position as the position of the to-be-tracked target in the previous frame, and taking the current image frame as the previous image frame, which is then followed by the operations of the face and body detection module 110, the time-series tracking module 120 and the face matching module 130 in sequence; if the face similarity is less than or equal to the predetermined face similarity threshold, there is no person matching the face of the to-be-tracked target outside the region corresponding to the current position of the time-series tracking target, and the body intersection determination module 140 is operated. The body intersection determination module 140 determines, according to the current position of the time-series tracking target and the body positions of other persons, whether the time-series tracking target is in an intersecting state, and if the time-series tracking target is not in the intersecting state, the update module 160 is operated, which is then followed by the operations of the face and body detection module 110, the time-series tracking module 120, the face matching module 130 and the body intersection determination module 140 in sequence; and if the time-series tracking target is in the intersecting state, the body matching module 150 is operated. The body matching module 150 is used for extracting the body features of other persons who intersect with the time-series tracking target, and calculating the body similarity between the body features of other persons and the body template of the to-be-tracked target, and determining the current target position according to the body similarity, so as to determine whether there is a person matching the body of the to-be-tracked target amongst other persons who intersect with the time-series tracking target. If the body similarity is greater than the predetermined body similarity threshold, then there is a person matching the body of the to-be-tracked target amongst other persons intersecting with the time-series tracking target, so that the time-series tracking target is not the correct to-be-tracked target; the body corresponding to the body feature with the greatest body similarity is obtained, and the to-be-tracked target is switched to the person corresponding to the body, thus the body position of the person is taken as the current target position, and the update module 160 is operated, which is then followed by the operations of the face and body detection module 110, the time-series tracking module 120, the face matching module 130, the body intersection determination module 140 and the body matching module 150 in sequence.

The vision-based target tracking method provided by the present application combines time-series tracking algorithm, face recognition and body recognition for target tracking. By combining the time-series tracking algorithm, a more reliable target position may be obtained, and the possibility of a sudden change in the posture of the target person is reduced; the face recognition is set as the first priority of target switching, and tracking of a wrong person in the intersecting state is effectively avoided by employing the body recognition, thereby reducing the tracking error during irregular intersection of the target person and other persons, and improving the accuracy of target tracking with high robustness.

Figure 7:
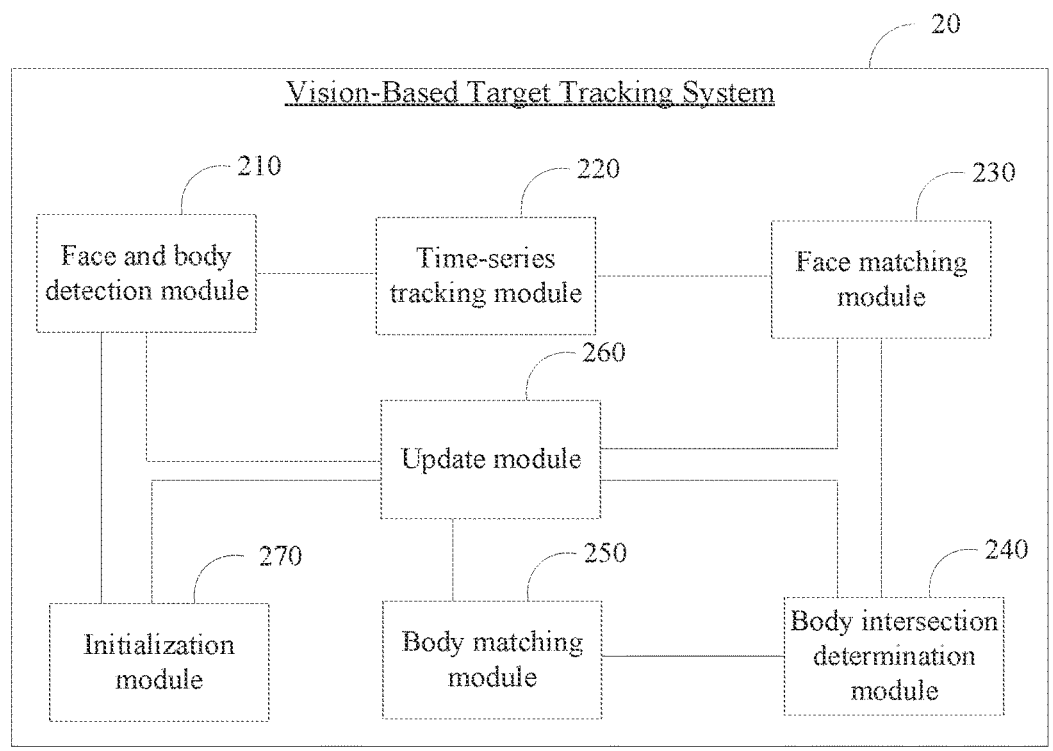
FIG. 7 is a block diagram of the vision-based target tracking system provided by another embodiment of the present application.

FIG. 7 is a block diagram of the vision-based target tracking system provided by another embodiment of the present application. As shown in FIG. 7, an initialization module 270 is added to the target tracking system 20 on the basis of the above-mentioned embodiment. The initialization module 270 is used for determining the to-be-tracked target amongst all persons according to the tracking requirements, extracting and saving the face template and the body template of the to-be-tracked target, and taking the body position of the to-be-tracked target as the current target position. According to the tracking requirements, the initialization module 270 determines the to-be-tracked target amongst all persons, and obtains the face image and the body image of the to-be-tracked target, so as to extract the face template of the to-be-tracked target by combining the face recognition model based on the deep neural network with the obtained face image, and the body template of the to-be-tracked target by combining the body recognition model based on the deep neural network with the obtained body image. The body position of the to-be-tracked target is taken as the current target position.

Based on the above design, the face and body detection module 210 is used for reading a current image frame so as to acquire and save face positions and body positions of all persons in the current image frame. The initialization module 270 is used for determining the to-be-tracked target amongst all persons, obtaining the face image and the body image of the to-be-tracked target, so as to extract the face template of the to-be-tracked target by combining the face recognition model based on the deep neural network with the obtained face image, and the body template of the to-be-tracked target by combining the body recognition model based on the deep neural network with the obtained body image, and taking the body position of the to-be-tracked target as the current target position. The update module 260 is used for taking the current target position as the position of the to-be-tracked target in the previous frame, and taking the current image frame as the previous image frame; the face and body detection module operates again for reading a current image frame so as to acquire and save face positions and body positions of all persons in the current image frame; the time-series tracking module 220 is used for acquiring a previous image frame and a position of a to-be-tracked target in the previous frame, and acquiring, according to the current image frame, the previous image frame, and the position of the target in the previous frame, a current position of a time-series tracking target by means of a time-series tracking algorithm. The face matching module 230 is used for acquiring all facial features corresponding to persons that are not in the region corresponding to the current position of the time-series tracking target, and calculating face similarities of all facial features corresponding to the persons that are not in the region corresponding to the current position of the time-series tracking target with respect to the face template of the to-be-tracked target. It is determined whether the face similarity is less than or equal to the determined face similarity threshold, so as to determine whether there is a person matching the face of the to-be-tracked target outside the region corresponding to the current position of the time-series tracking target. If the face similarity is greater than the predetermined face similarity threshold, then there is a person matching the face of the to-be-tracked target outside the region corresponding to the current position of the time-series tracking target, and the time-series tracking target is not the correct to-be-tracked target; the face corresponding to the facial feature with the largest face similarity is obtained, and the to-be-tracked target is switched to the person corresponding to the face, and the body position of the person is taken as the current target position, and the update module 260 is operated, which is then followed by the operations of the face and body detection module 210, the time-series tracking module 220, and the face matching module 230. If the face similarity is less than or equal to the predetermined face similarity threshold, the body intersection determination module 240 is operated. The body intersection determination module 240 determines, according to the current position of the time-series tracking target and the body positions of other persons, whether the time-series tracking target is in an intersecting state; if the time-series tracking target is not in the intersecting state, then the current position of the time-series tracking target is taken as the current target position, and the update module 260 is operated, which is then followed by the operations of the face and body detection module 210, the time-series tracking module 220, the face matching module 230 and the body intersection determination module 240 in sequence; and if the time-series tracking target is in the intersecting state, the body matching module 250 is operated. The body matching module 250 is used for extracting the body features of other persons who intersect with the time-series tracking target, and calculating the body similarity between the body features of other persons and the body template of the to-be-tracked target, and determining the current target position according to the body similarity, so as to determine whether there is a person matching the body of the to-be-tracked target amongst other persons who intersect with the time-series tracking target. If the body similarity is greater than the predetermined body similarity threshold, then there is a person matching the body of the to-be-tracked target amongst other persons intersecting with the time-series tracking target, so that the time-series tracking target is not the correct to-be-tracked target; the body corresponding to the body feature with the greatest body similarity is obtained, and the to-be-tracked target is switched to the person corresponding to the body, thus the body position of the person is taken as the current target position, and the update module 260 is operated, which is then followed by the operations of the face and body detection module 210, the time-series tracking module 220, the face matching module 230, the body intersection determination module 240 and the body matching module 250 in sequence; and if the body similarity is smaller than or equal to the predetermined body similarity threshold, then the current position of the time-series tracking target is taken as the current target position, and the update module 260 is operated, which is then followed by the operations of the face and body detection module 210, the time-series tracking module 220, the face matching module 230, the body intersection determination module 240 and the body matching module 250 in sequence.

The vision-based target tracking system provided by this embodiment of the present application deploys the time-series tracking module, the face matching module, the body intersection determination module and the body matching module, in combination with the time-series tracking algorithm, the face recognition and the body recognition for target tracking. By combining the time-series tracking algorithm, a more reliable target position may be obtained based on the time-series information of the to-be-tracked target, and the possibility of a sudden change in the posture of the target person is reduced to obtain a more reliable target position when the to-be-tracked target is not in the intersecting state; the face recognition is set as the first priority of target switching, and tracking of a wrong person in the intersecting state is effectively avoided by employing the body recognition, thereby reducing the tracking error during irregular intersection of the target person and other persons and improving the accuracy of target tracking with high robustness.

Figure 8:
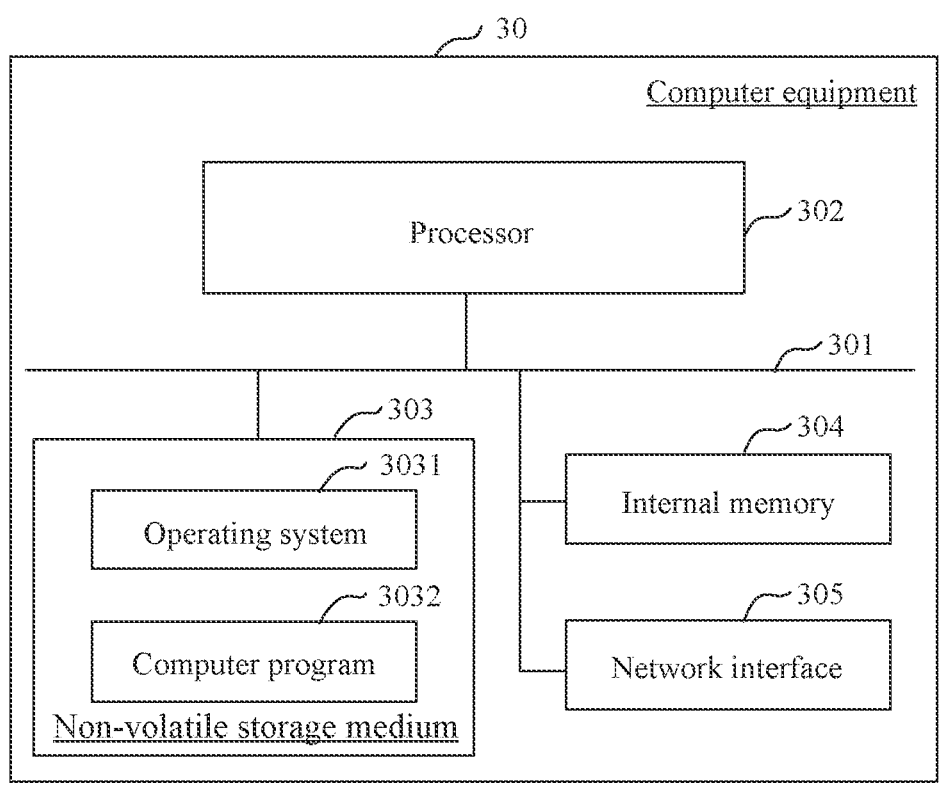
FIG. 8 is a structural block diagram of a computer equipment provided by an embodiment of the present application.

The above-mentioned vision-based target tracking system can be implemented in the form of a computer program that can run on a computer equipment as shown in FIG. 8.

Referring to FIG. 8, which is a block diagram of a computer equipment according to an embodiment of the present application. The computer equipment 30 may be a terminal, or may also be a server. The terminal may be an electronic device with communication functions, such as a tablet, a laptop, and a desktop computer. The server may be an independent server or a server cluster consists of a plurality of servers.

Referring to FIG. 8, the computer equipment 30 includes a processor 302, a memory and a network interface 305 connected through a system bus 301, and the memory may include a non-volatile storage medium 303 and an internal memory 304. The non-volatile storage medium 303 stores an operating system 3031 and a computer program 3032. The computer program 3032 includes program instructions that, when executed, allows the processor 302 to implement a vision-based target tracking method. The processor 302 is used for providing computing and control capabilities in order to support the operation of the entire computer equipment 30. The internal memory 304 provides an environment for the execution of the computer program 3032 in the non-volatile storage medium 303, and the processor 302 implement a vision-based target tracking method when the computer program 3032 is executed by the processor 302. The network interface 305 is used for network communication with other devices. It can be understood by those skilled in the art that the structure shown in FIG. 8 is merely a block diagram of a part of the structure related to the proposal of the present application, and the computer equipment 30 to which the proposal of the present application is applied is not limited thereto. The specific computer equipment 30 may include more or fewer components compared with that shown in the drawings, or combine certain components, or have a different arrangement of components.

The processor 302 is configured to run the computer program 3032 stored in the memory to implement a vision-based target tracking method, which includes step A: reading a current image frame so as to acquire and save face positions and body positions of all persons in the current image frame; step B: acquiring a previous image frame and a position of a to-be-tracked target in the previous frame, and acquiring, according to the current image frame, the previous image frame, and the position of the target in the previous frame, a current position of a time-series tracking target by means of a time-series tracking algorithm; step C: determining whether a person matching a face of the to-be-tracked target exists outside of a region corresponding to the current position of the time-series tracking target, and if not, proceeding to step D; step D: determining, according to the current position of the time-series tracking target and body positions of other persons, whether the time-series tracking target is in an intersecting state, and if yes, proceeding to step E; step E: determining whether there is a person matching a body of the to-be-tracked target amongst other persons intersecting with the time-series tracking target, if not, taking the current position of the time-series tracking target as a current target position, and proceeding to step F; step F: maintain tracking, proceeding to step G; and step G: taking the current target position as the position of the to-be-tracked target in the previous frame, taking the current image frame as the previous image frame, and returning to step A.

In the computer equipment provided by the embodiment of the present application, execution of the computer program stored in the computer program is not limited to the above-mentioned method, related operations in the vision-based target tracking method provided by any embodiment of the present application may also be executed.

It should be understood that, in the embodiment of the present application, the processor 302 may be a central processing unit (CPU), and the processor 302 may also be other general-purpose processors, digital signal processors (DSP), Application Specific Integrated Circuit (ASIC), Field-Programmable Gate Array (FPGA) or other programmable logic devices, discrete gate or transistor logic devices, discrete hardware components, and the like. The general-purpose processor may be a microprocessor or the processor may also be any conventional processor and the like.

Those skilled in the art can appreciate that all or part of the processes in the method of the above embodiments can be implemented by instructing relevant hardware through a computer program. The computer program includes program instructions, and the computer program can be stored in a storage medium, which is a computer-readable storage medium. The program instructions are executed by at least one processor in the computer system to implement the steps of the above-mentioned method.

Therefore, the present application also provides a storage medium. The storage medium may be a computer-readable storage medium which stores a computer program, and the computer program includes program instructions. The processor implements a vision-based target tracking method when the program instructions are executed by the processor, the target tracking method includes step A: reading a current image frame so as to acquire and save face positions and body positions of all persons in the current image frame; step B: acquiring a previous image frame and a position of a to-be-tracked target in the previous frame, and acquiring, according to the current image frame, the previous image frame, and the position of the target in the previous frame, a current position of a time-series tracking target by means of a time-series tracking algorithm; step C: determining whether a person matching a face of the to-be-tracked target exists outside of a region corresponding to the current position of the time-series tracking target, and if not, proceeding to step D; step D: determining, according to the current position of the time-series tracking target and body positions of other persons, whether the time-series tracking target is in an intersecting state, and if yes, proceeding to step E; step E: determining whether there is a person matching a body of the to-be-tracked target amongst other persons intersecting with the time-series tracking target, if not, taking the current position of the time-series tracking target as a current target position, and proceeding to step F; step F: maintain tracking, proceeding to step G; and step G: taking the current target position as the position of the to-be-tracked target in the previous frame, taking the current image frame as the previous image frame, and returning to step A.

In a storage medium provided by an embodiment of the present application, the program instructions in the computer program stored in the storage medium are not limited to the above-mentioned method and operations, and relevant operations in the vision-based target tracking method provided by any embodiment of the present application can also be implemented.

The storage medium may be various computer-readable storage media that can store program codes, such as a mobile hard disk, a read-only memory (ROM), a magnetic disk, and an optical disk.

Those skilled in the art can appreciate that the units and algorithm steps described in the exemplary embodiments can be implemented by electronic hardware, computer software, or a combination thereof. In order to clearly illustrate the interchangeability between the hardware and software, the exemplary components and steps are generally described in terms of their functions in the above description. Whether these functions are executed by hardware or software depends on the specific application and design constraints of the technical proposal. Professionals and technicians may use different methods for each specific application to implement the described functions, but such implementation should not be considered beyond the scope of the present application. It should be understood that, in the several embodiments provided in the present application, the disclosed system and method may be implemented in other manners. The steps in the method of the embodiment of the present application may be adjusted in order, combined and deleted according to actual needs. Units in the system of the embodiment of the present application may be combined, divided, and deleted according to actual needs. In addition, each functional unit in each embodiment of the present application may be integrated into one processing unit, or each unit may be physically separated, or two or more units may be integrated into one unit.

The above are merely the detailed embodiments of the present application, but the scope of protection of the present application is not limited thereto. Any one skilled in the art can easily think of various equivalent modifications or substitutions within the technical scope disclosed in the present application. These modifications or substitutions shall fall within the scope of protection of the present application. Therefore, the scope of protection of the present application is defined by the appended claims.

What is claimed is:

1. A non-transitory computer-readable medium with instruction stored thereon, that when executed by a processor, perform vision-based target tracking method comprising steps:
   step A: reading a current image frame so as to acquire and save a face position and a body position of all persons in the current image frame;
   step B: acquiring a previous image frame and a position of a to-be-tracked target in previous frame, and acquiring, according to the current image frame, the previous image frame and the position of the target in previous image frame, a current position of a time-series tracking target by using a time-series tracking algorithm;
   step C: determining whether a person matching a face of the to-be-tracked target exists outside a region corresponding to the current position of the time-series tracking target;
   step D: when there is no a person matching a face of the to-be-tracked target existing outside a region corresponding to the current position of the time-series tracking target, determining whether the time-series tracking target is in an intersecting state according to the current position of the time-series tracking target and the body position of other persons;
   step E: when the time-series tracking target is in an intersecting state, determining whether a person matching a body of the to-be-tracked target exists amongst the other persons intersecting with the time-series tracking target, when there is no a person matching a body of the to-be-tracked target exists amongst the other persons intersecting with the time-series tracking target, taking the current position of the time-series tracking target as a current target position;
   step F: keeping tracking; and
   step G: taking the current target position as the position of the to-be-tracked target in the previous image frame, taking the current image frame as the previous image frame, the time-series tracking algorithm, face recognition and body recognition are combined to obtain the current target position as the position of the to-be-tracked target for target tracking by reducing possibility of a sudden change in the posture of the target person, and reducing the tracking error during irregular intersection of the target person and other persons, and the face recognition is set as the first priority of target switching.

2. The vision-based target tracking method according to claim 1, wherein the step C further comprises:
   step C1: acquiring all facial features corresponding to persons outside the region corresponding to the current position of the time-series tracking target, and calculating a face similarity with respect to a face template of the to-be-tracked target; and
   step C2: determining whether the face similarity is less than or equal to a predetermined face similarity threshold, when the face similarity is less than or equal to a predetermined face similarity threshold, resulting in a person matching the face of the to-be-tracked target does not exist outside the region corresponding to the current position of the time-series tracking target, and proceeding to the step D.

3. The vision-based target tracking method according to claim 1, wherein the step C further comprises,
   step c: when the person matching the face of the to-be-tracked target exists outside the region corresponding to the current position of the time-series tracking target, switching the to-be-tracked target to the person, taking the body position of the person as the current target position, and proceeding to the step G.

4. The vision-based target tracking method according to claim 1, wherein the step D further comprises,
   step d, when the time-series tracking target is not in the intersecting state, taking the current position of the time-series tracking target as the current target position, and proceeding to the step G.

5. The vision-based target tracking method according to claim 1, wherein the step E further comprises:
   step E1: extracting body features of the other persons who intersect with the time-series tracking target, and calculating a body similarity between the body features of the other persons and a body template of the to-be-tracked target;
   step E2: determining whether the body similarity is less than or equal to a predetermined body similarity threshold; and
   step E3: when the body similarity is less than or equal to a predetermined body similarity threshold, taking the current position of the time-series tracking target as the current target position, and proceeding to the step F.

6. The vision-based target tracking method according to claim 1, wherein the step E further comprises,
   step e: when the person matching the body of the to-be-tracked target exists amongst the other persons intersecting with the time-series tracking target, switching the to-be-tracked target to the person, taking the body position of the person as the current target position, and proceeding to the step G.

7. The vision-based target tracking method according to claim 1, wherein before the step B, the vision-based target tracking method further comprises steps:
   step a1: determining whether the to-be-tracked target is confirmed, when the to-be-tracked target is confirmed, proceeding to step B when the to-be-tracked target is not confirmed, proceeding to step a2;
   step a2: confirming the to-be-tracked target amongst the all persons according to a tracking requirement, and extracting and saving a face template and a body template of the to-be-tracked target;
   step a3: taking the body position of the to-be-tracked target as the current target position, and proceeding to the step G.

8. A vision-based target tracking system, comprising,
   a computer equipment with a processor, a memory and a network interface connected through a system bus;
   the memory comprises a non-volatile storage medium and an internal memory, and the non-volatile storage medium stores a computer program; and
   the computer program in the memory is executed by the processor to:
   read a current image frame, acquiring and saving a face position and a body position of all persons in the current image frame;
   acquire a previous image frame and a position of a to-be-tracked target in the previous image frame, and acquiring, according to the current image frame, the previous image frame, and the position of the to-be-tracked target in the previous image frame, a current position of a time-series tracking target by using time-series tracking algorithm;
   determine whether a person matching a face of the to-be-tracked target exists outside a region corresponding to the current position of the time-series tracking target, and obtaining a current target position according to a determining result;
   determine whether the time-series tracking target is in an intersecting state according to the current position of the time-series tracking target and the body position of other persons;
   determine whether a person matching a body of the to-be-tracked target exists amongst the other persons who intersect with the time-series tracking target, and obtaining the current target position according to the determining result, and
   take the current target position as the position of the to-be-tracked target in the previous image frame, and taking the current image frame as the previous image frame, the time-series tracking algorithm, face recognition and body recognition are combined to obtain the current target position as the position of the to-be-tracked target for target tracking by reducing possibility of a sudden change in the posture of the target person, and reducing the tracking error during irregular intersection of the target person and other persons, and the face recognition is set as the first priority of target switching.

9. The vision-based target tracking method according to claim 1, wherein the intersecting state refers to an overlap of regions corresponding to the body positions of the persons.

10. The vision-based target tracking method according to claim 1, wherein the accuracy of the time-series tracking target is determined by both the face matching of the persons outside the region corresponding to the current position of the time-series tracking target and the intersecting state of the time-series tracking target within the current position of the time-series tracking target.

11. The vision-based target tracking method according to claim 2, wherein the step C further comprises: when the face similarity is greater than the predetermined face similarity threshold, obtaining the face with the facial feature having the largest face similarity, switching the to-be-tracked target to the person corresponding to the face, and taking the body position of the person as the current target position, and proceeding to step G, and the current target position represents the exact body position of the to-be-tracked target, and the corresponding body position is taken as the current target position.

12. The vision-based target tracking system according to claim 8, wherein the intersecting state refers to an overlap of regions corresponding to the body positions of the persons.

13. The vision-based target tracking system according to claim 8, wherein the accuracy of the time-series tracking target is determined by both the face matching of the persons outside the region corresponding to the current position of the time-series tracking target and the intersecting state of the time-series tracking target within the current position of the time-series tracking target.

* * * * *